US012460895B2

(12) United States Patent
Hall et al.

(10) Patent No.: US 12,460,895 B2
(45) Date of Patent: Nov. 4, 2025

(54) DEVICE FOR MEASURING ARROW LOCATION AT REST

(71) Applicant: HAMSKEA ARCHERY SOLUTIONS LLC, Frederick, CO (US)

(72) Inventors: Devin Hall, Ft. Collins, CO (US); Shawn A. Greathouse, Johnstown, CO (US); Andrew W. Munsell, Brighton, CO (US)

(73) Assignee: Hamskea Archery Solutions LLC, Frederick, CO (US)

( * ) Notice: Subject to any disclaimer, the term of this patent is extended or adjusted under 35 U.S.C. 154(b) by 819 days.

(21) Appl. No.: 17/658,692

(22) Filed: Apr. 11, 2022

(65) Prior Publication Data

US 2022/0325978 A1 Oct. 13, 2022

Related U.S. Application Data

(60) Provisional application No. 63/201,078, filed on Apr. 12, 2021.

(51) Int. Cl.

| | |
|---|---|
| ***F41B 5/14*** | (2006.01) |
| ***G01B 5/02*** | (2006.01) |

(52) U.S. Cl.

CPC .............. *F41B 5/1442* (2013.01); *G01B 5/02* (2013.01)

(58) Field of Classification Search

CPC ......... F41B 5/1442; F41B 5/1453; G01B 5/02

See application file for complete search history.

(56) References Cited

U.S. PATENT DOCUMENTS

| | | | | |
|---|---|---|---|---|
| 3,088,212 A | | 5/1963 | Smith | |
| 3,651,578 A | * | 3/1972 | Saunders | F41H 5/14 33/286 |
| 4,911,137 A | | 3/1990 | Troncoso | |
| 5,175,937 A | * | 1/1993 | Emerson, III | F41B 5/14 33/503 |
| 5,303,479 A | | 4/1994 | Rudovsky | |
| 5,421,314 A | * | 6/1995 | Kidney | F41B 5/143 124/44.5 |
| 5,960,779 A | * | 10/1999 | Jessee | F41B 5/143 124/44.5 |
| 6,082,012 A | * | 7/2000 | McLeod | F41G 1/467 124/87 |
| 6,202,635 B1 | * | 3/2001 | Evans | F41B 5/143 124/44.5 |
| 6,276,352 B1 | * | 8/2001 | Harris | F41B 5/143 124/44.5 |
| 6,526,666 B1 | | 3/2003 | Lastinger, Jr. | |
| 7,574,810 B1 | * | 8/2009 | LoRocco | F41G 1/44 124/87 |

(Continued)

*Primary Examiner* — Yaritza Guadalupe-Mccall

(74) *Attorney, Agent, or Firm* — Trenner Law Firm, LLC; Mark Trenner

(57) ABSTRACT

A device is disclosed for measuring arrow position or location at rest. An example device includes a platform that mounts to an archery bow system to determine a position of an arrow shaft in relation to an inside of a riser shelf of the archery bow system for tuning or data collection. The example device also includes a first slot in the platform. A center shot indicator adjacent to the first slot references the center shot of the arrow shaft. A measurement reference is slidable, separately, in the first slot to reference center shot of the arrow shaft.

21 Claims, 17 Drawing Sheets

(56) References Cited

U.S. PATENT DOCUMENTS

| | | | | |
|---|---|---|---|---|
| 7,574,811 | B2 * | 8/2009 | Kurtzhals | F41G 1/467 124/87 |
| 7,581,325 | B1 | 9/2009 | Willman | |
| 7,748,371 | B1 * | 7/2010 | Doty | F41B 5/143 124/44.5 |
| 7,975,391 | B1 | 7/2011 | Gillingham | |
| 9,255,763 | B2 | 2/2016 | Forestieri, Sr. et al. | |
| 9,500,434 | B1 * | 11/2016 | LoRocco | F41B 5/143 |
| 9,593,904 | B2 * | 3/2017 | Naki | F41B 5/148 |
| 10,088,264 | B2 * | 10/2018 | Summers | F41B 5/143 |
| 10,539,390 | B2 * | 1/2020 | Summers | F41B 5/143 |
| 10,746,498 | B2 * | 8/2020 | Garretson | F41B 5/105 |
| 11,391,537 | B2 * | 7/2022 | Garretson | F41B 5/143 |
| 11,609,062 | B1 * | 3/2023 | O'Loughlin | F41B 5/143 |
| 11,754,364 | B2 * | 9/2023 | Summers | F41B 5/143 124/44.5 |
| 2008/0173290 | A1 * | 7/2008 | Harwath | F41B 5/143 124/44.5 |
| 2009/0032004 | A1 | 2/2009 | Jones | |
| 2010/0107430 | A1 * | 5/2010 | Deien | F41G 1/467 33/265 |
| 2011/0023311 | A1 | 2/2011 | Williams | |
| 2012/0138035 | A1 * | 6/2012 | Ellig | F41B 5/143 124/44.5 |
| 2022/0325978 | A1 * | 10/2022 | Hall | G01B 5/02 |
| 2023/0272995 | A1 * | 8/2023 | Munsell | F41B 5/143 124/41.1 |

* cited by examiner

DEVICE FOR MEASURING ARROW LOCATION AT REST

PRIORITY CLAIM

This application claims the priority filing benefit of U.S. Provisional Patent Application No. 63/201,078 filed Apr. 12, 2021 for "Device For Measuring Arrow Location At Rest" of Devin Hall, Shawn A. Greathouse, and Andrew W. Munsell, hereby incorporated by reference in its entirety as though fully set forth herein.

BACKGROUND

In all forms of archery, optimizing the position of the arrow as part of the bow system is a critical step in the tuning process toward maximizing the accuracy of the archer with the bow system. An arrow rest can be adjusted vertically and horizontally to position the arrow at the optimum position (horizontal and vertical) relative to the vertical inside surface and the horizontal inside surface of a sight window of the bow riser. Various methods are used by the archer to evaluate the arrow's position for that optimum position that is dependent on the archery, bow, arrow rest, arrow and release aid. Once the optimum arrow position is obtained, the archer can now use the bow system for critical dimensions, practice, competitive events or for hunting. With these critical dimensions known, the archer can quickly ascertain or troubleshoot an inaccuracy in the bow system by referencing these dimensions and allows for consistency in tracking that individual bow system's exact setup for repeatable performance.

The horizontal distance referenced to the center of the arrow from the inside vertical surface of the bow riser is referred to as the "Center Shot". The recommended center shot varies, e.g., depending on the bow manufacturer and specific model of the bow. At an optimum center shot, the force of the bowstring propels the arrow forward when the bow string is released. As the bowstring is released it travels in a mostly vertical plane that extends to the target. When the axis of the arrow is in alignment with the mostly vertical plane defined by the released bow string, optimum arrow flight is achieved. If this co-alignment is not exact, inaccuracy may remain in the bow system.

Similarly, the vertical position of the arrow relative to the mostly vertical plane defined by the released bow string is critical for optimum performance and accuracy. The optimum vertical position is related to the axis of the arrow and is defined as the center of the aft end of the arrow to the center of forward end (e.g., tip) of the arrow is parallel to the horizontal axis of the mostly horizontal plane defined by the riser shelf.

Measuring the vertical position with the arrow on the arrow rest can be difficult, as the maximum effective force applied to the launcher of the arrow rest is when the bow is at rest (Position 1). This configuration places the center-of-gravity (CG) of the arrow forward (toward the target) of the arrow rest/launcher while the aft end of the arrow is attached to the bow string. The mass of the arrow positioned at the CG of the arrow is cantilevered as the aft end of the arrow is attached to the bow string.

The arrow rest/launcher positioned between the arrow's CG and the bow string generates a torque and associated force on the arrow rest's launcher resulting in the launcher yielding/flexing down from its natural resting position. When the bow string is drawn/pulled back to the firing position (Position 2), the CG of the arrow is positioned behind the arrow rest/launcher reducing the cantilevered force on the launcher effectively raising the arrow's vertical position. This vertical position of the arrow in position 2 is the critical dimension that sets the arrow axis mostly parallel to the horizontal axis of the plane defined by the released bow string.

When in Position 1, estimating the vertical position of the arrow in Position 2 is oftentimes achieved by manually lifting the arrow thereby relieving the force on the arrow rest's launcher. This technique is not repeatable and cannot be reliably measured.

Current devices for measuring the arrow's horizontal position are referenced to the outside vertical surface of the bow riser, with no ability to measure the vertical position of the arrow. Current techniques for referencing the arrow height are based on a squaring device that extends a line of reference perpendicular to the bowstring string.

DETAILED DESCRIPTION

Figure 1:
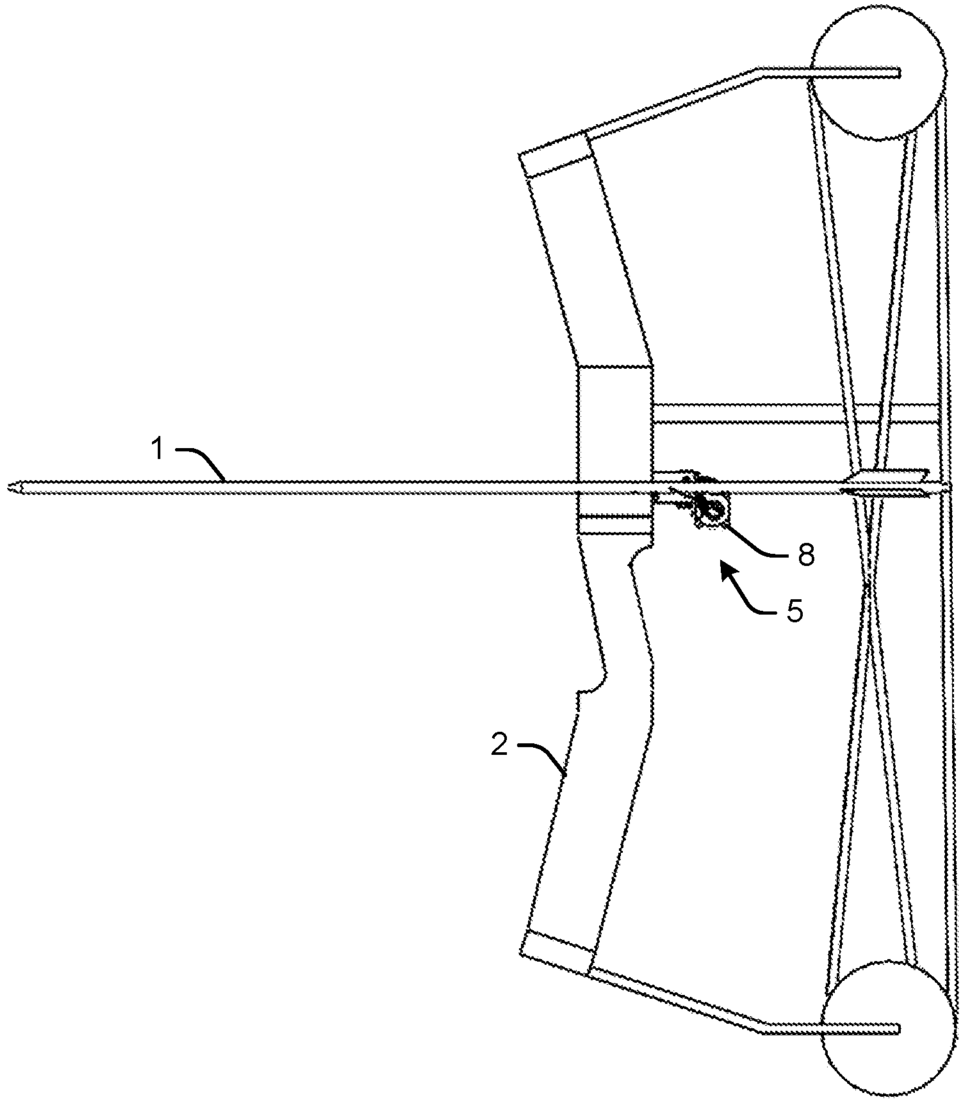
FIG. 1 is a perspective view of an example bow system at static or rest.

A device for measuring arrow location or position at rest is disclosed herein. The device makes both horizontal and vertical measurements simultaneously while lifting the arrow in Position 1 for a repeatable measurement. The term "location" and "position" are used interchangeably herein with the same meaning.

In an example, the device may be implemented as a "tool" to reference an arrow's proximity to the inside surface(s) of the bow riser in a horizontal and/or vertical manner. In an example, the device for measuring arrow location or position at rest is a compact size to fit inside a riser shelf and provides an accurate and repeatable measurement for the archer.

In an example, the device for measuring arrow location or position at rest (e.g., Position 1) includes at least one leveling reference to position the device such that the measurement is perpendicular to the inside vertical surface of the bow riser when the device is attached to the arrow.

In an example, the device for measuring arrow location or position at rest includes a measuring system (e.g., a ruler or laser), by way of non-limiting illustration for ranges between about 1.5 inches and 0.25 inches. In an example, a measurement device that slides in a detent in multiple orientations to include vertical and horizontal and is locked or clamped into place by a threaded knob that can be placed into multiple locations depending on measurement reference location.

In an example, the measuring system or measurement reference interacts with a tuning system that allows for fine linear movements of the ruler by means of a smooth interference fit between a disc and ruler edge with a rough finish. This tuning system may also be accomplished by other means to include rack and pinion or a worm drive system.

In an example, the measurement reference is shaped so that the ends decrease in surface area allowing for a more accurate point of reference.

In an example, the device for measuring arrow location at rest effectively provides an archer the ability to measure and monitor the location of their arrow in relation to the inside bow riser (vertical and horizontal) to aid in bow setup and data collection.

In an example, the device for measuring arrow position or location at rest specifically allows for the measurement based on the inside of the bow riser vertical surface, eliminating inconsistency due to variation in thickness of the bow risers between bow models.

In an example, the device for measuring arrow position or location at rest also implements the use of a weight offsetting system to account for weight of the arrow and the device. The weight offsetting system eliminates any error that occurs due to the weight of the arrow and the device that would flex the arrow launcher, thereby giving inaccurate measurements. The weight offsetting system relieves weight of the device and arrow to provide an accurate and repeatable representation of the arrow location when the bow is at full draw (Position 2). The estimated position is evaluated by a second or the same (e.g., bi-axis) leveling device that is perpendicular to the first leveling device, where the two axes define a plane.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

FIG. 1 is a perspective view of a bow system including the bow riser 2, arrow shaft 1, and arrow rest 8. The location of the arrow in relation to the riser shelf both vertically and horizontally influences arrow flight and overall performance.

Figure 2:
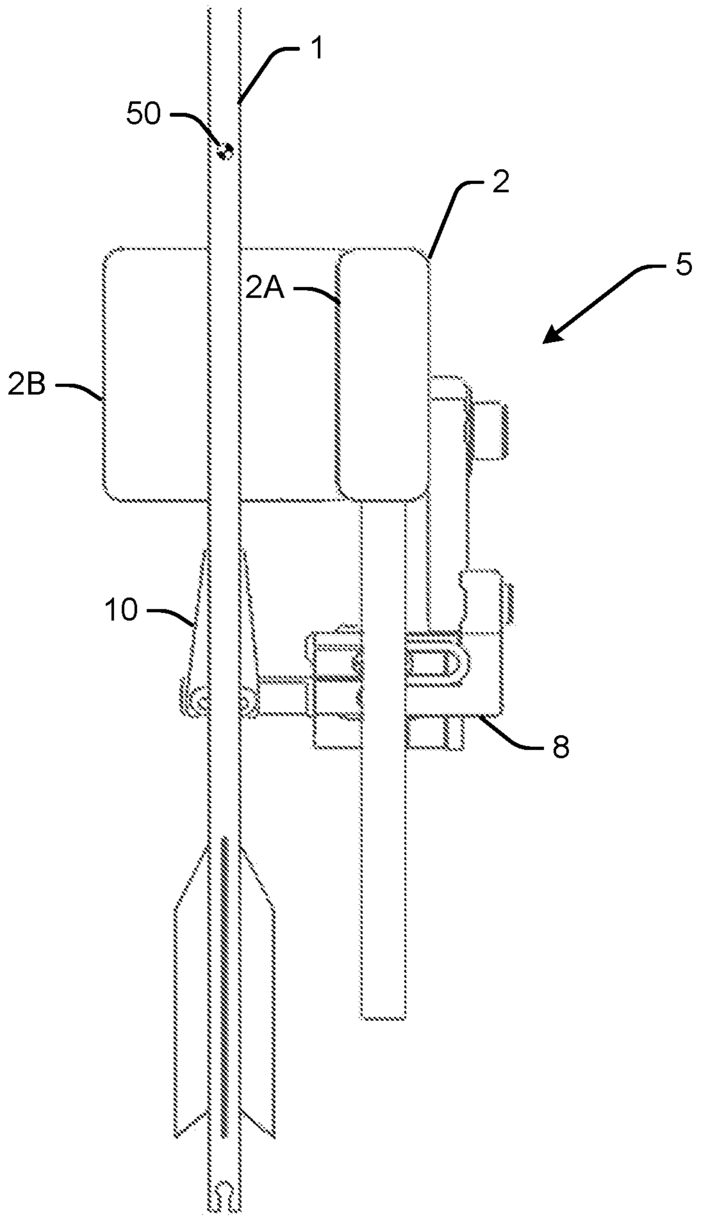
FIG. 2 is a top perspective view of an example arrow, arrow rest and their relation to a bow riser.

FIG. 2 is a perspective top view showing the relationship of the arrow shaft 1 in relation to the arrow rest launcher 10 and bow riser 2. FIG. 2 illustrates what is referred to herein as Position 1. In this example, the center-of-gravity (CG) 50 is in front of the arrow rest (e.g., facing toward the target). Since the thickness of the bow riser 2 can vary from model to model, it is best to measure the distance from the center of the arrow shaft 1 and the inside edge of the riser shelf 2A.

Figure 3:
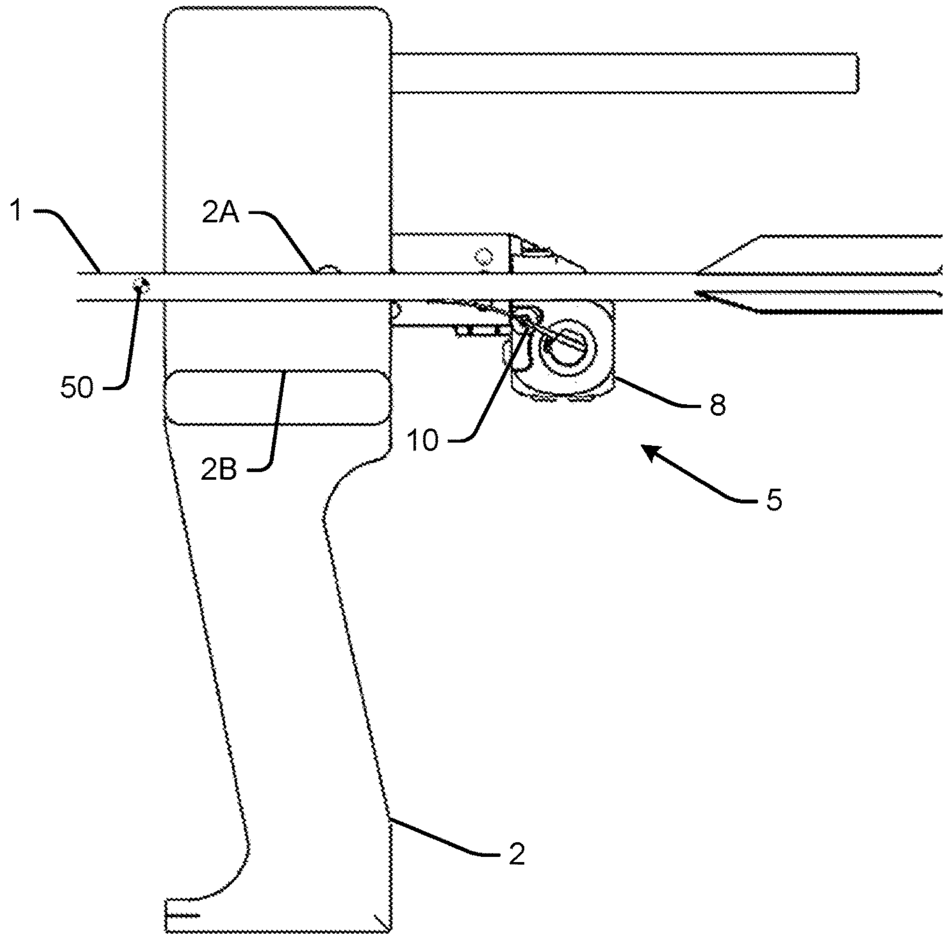
FIG. 3 is a perspective view of an example arrow, arrow rest, and the relation to a bow riser at a static position, showing the full arrow weight pushing down and flexing the rest launcher.

FIG. 3 is a perspective side view showing the relationship of the arrow shaft 1 in relation to the arrow rest launcher 10 and bow riser 2 when the bow is at rest. FIG. 3 illustrates what is referred to herein as Position 1. In this example, the CG 50 is in front of the arrow rest (e.g., facing toward the target). When the bow is at rest, most of the arrow shaft 1 sits on the opposite side of the arrow rest launcher 10 from the bow string. This puts significant downward force on the arrow rest launcher 10. Launchers with a flexible nature yield to this downward force and hold the arrow shaft 1 at a lower vertical position.

In FIG. 3, the flexible arrow rest launcher 10 is exhibiting significant yielding, as illustrated by the nonlinear shape. Measurements made at this time are not accurate because the arrow shaft 1 changes vertical position when the weight shifts from one side of the arrow rest launcher 10 to the other side, or as the launcher spring rate changes over time (e.g., due to fatigue).

Figure 4:
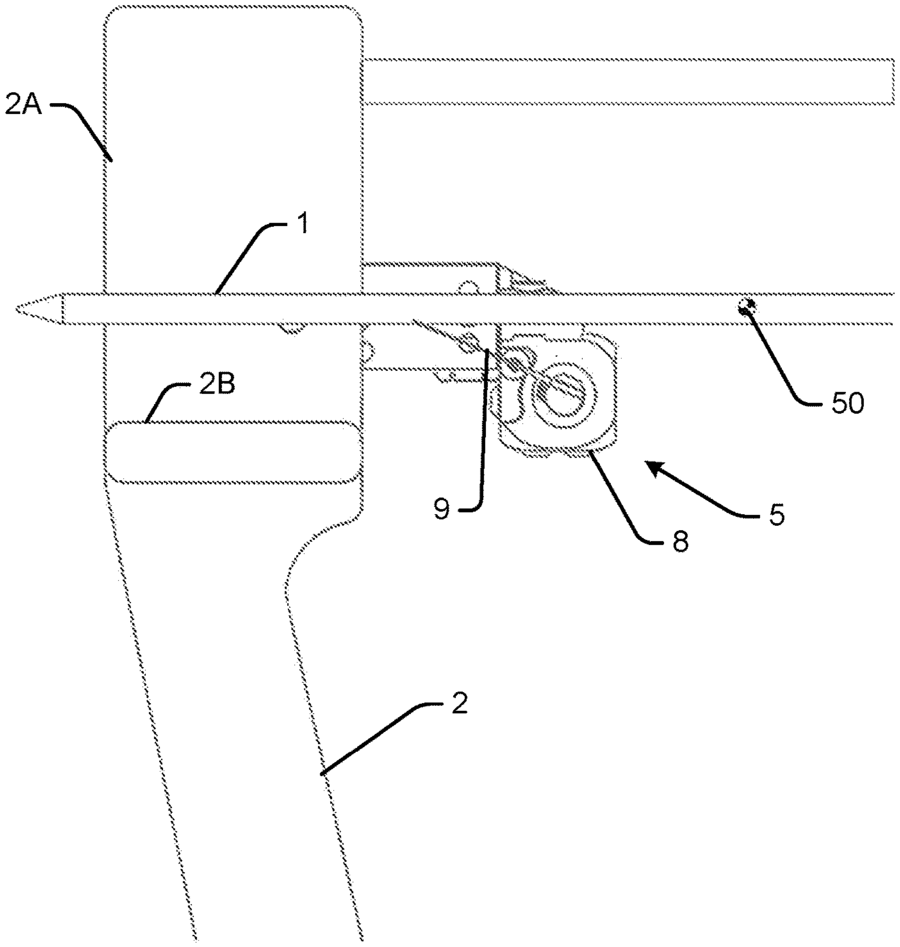
FIG. 4 is a perspective view of an example arrow, arrow rest, and their relation to the bow riser at full draw, showing minimal arrow weight resting on the launcher and the launcher is linear.

FIG. 4 is a perspective side view showing the relationship of the arrow shaft 1 in relation to an arrow rest launcher 9 and bow riser 2 when the bow is at full draw. FIG. 4 illustrates what is referred to herein as Position 2. In this example, the CG 50 is in front of the arrow rest (e.g., facing toward the target). When the bow is at full draw, most of the arrow weight has shifted to the other side of the arrow rest launcher 9 and has less downward force acting on the arrow rest launcher 9. With less downward force acting on the arrow rest launcher 9, it will not yield and is in a linear state. A linear arrow rest launcher 9 allows for a consistent measurement of the arrow shaft 1 vertical location in relation to the riser shelf 2B and represents the arrow shaft 1 location as it is shot.

Figure 5:
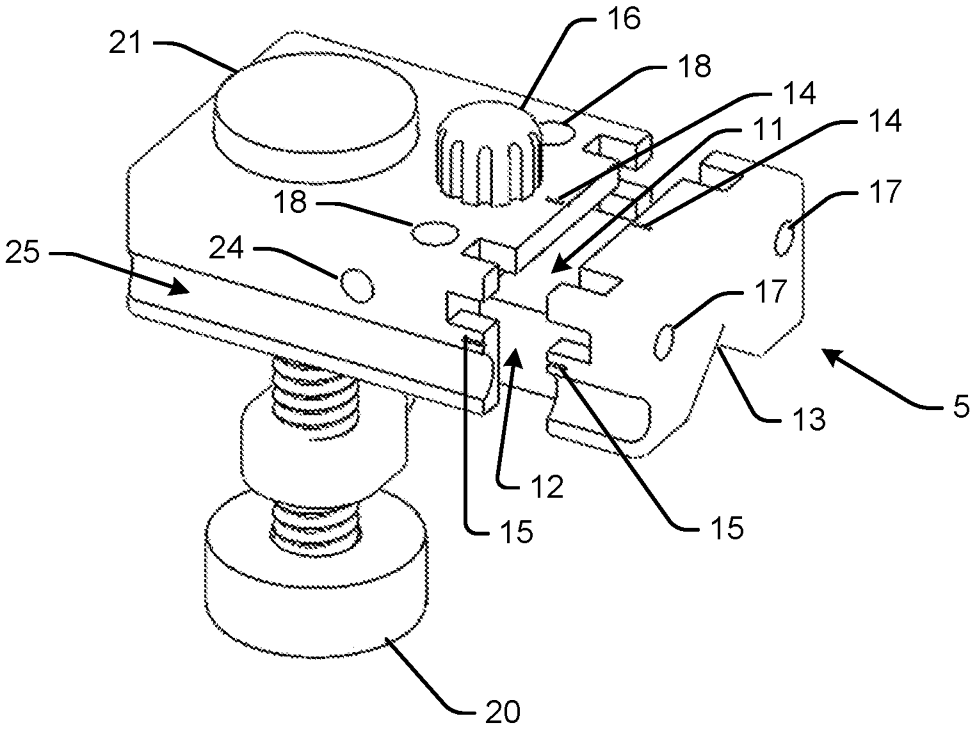
FIG. 5 is a perspective view of the example device as it sits off the arrow shaft and without the measurement reference.

FIG. 5 is a perspective view of an example device 5 for measuring arrow shaft 1 location or position. The CG 50 is illustrated as being behind the arrow rest, (e.g., between the arrow rest and the aft end of the arrow attached to the bow string). The device 5 is shown in FIG. 5 without the measurement reference 6. The measurement reference 6 (see FIG. 6) fits in recess or slot 11 to measure center shot, and in recess or slot 12 for measuring arrow height. The measurement reference 6 may be held in place by screws in threaded holes 17.

An example device 5 for measuring arrow position or location at rest includes a platform that mounts to an archery bow system to determine a position of an arrow shaft 1 in relation to an inside of a riser shelf of the archery bow system for tuning or data collection. The example device 5 also includes a first (e.g., vertical) slot 12 in the platform, and a second (e.g., horizontal) slot 11 in the platform. One or more height indicator 15 is shown adjacent to a slot that references height of the arrow shaft 1. One or more center shot indicator 14 is shown adjacent to the second slot 11 that references center shot of the arrow shaft 1. A measurement reference 6 is slidable, separately, in the slot that references height (see, e.g., FIG. 6) and the slot that references center shot (see, e.g., FIG. 9) of the arrow shaft 1. It is noted that these slots are referred to interchangeably herein as "first" slot and "second" slot. The terms "first" and "second" are only intended to distinguish one slot from the other and are not limiting in any manner.

Figure 6:
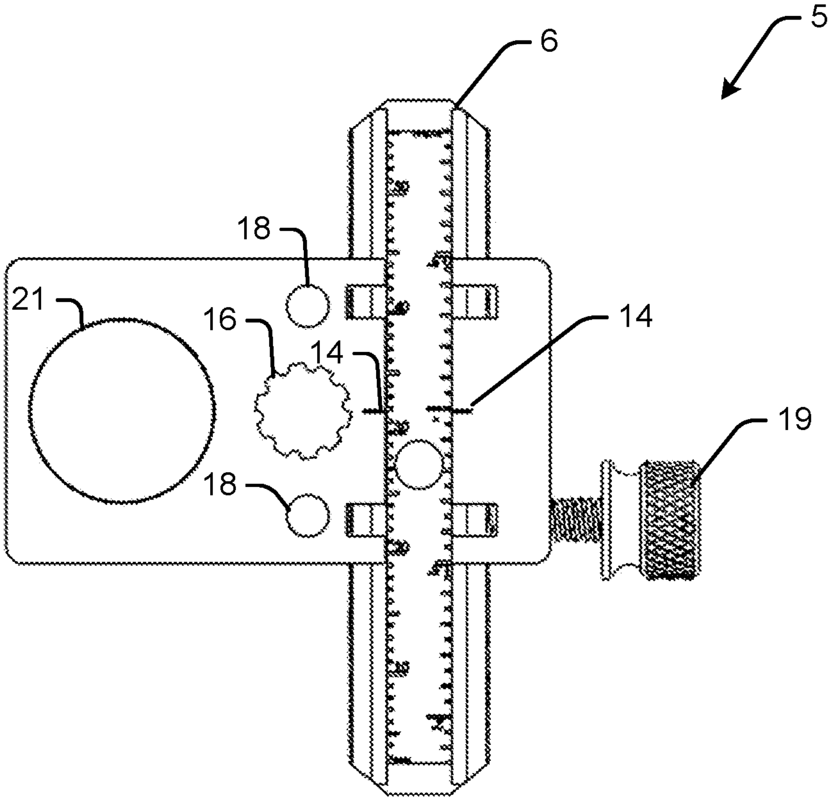
FIG. 6 is a perspective view of the example device as it sits off the arrow shaft with the measurement reference set for center shot.

Compare the relationship of reference marks 14 to the measuring reference 6 for measuring center shot and indicator marks 15 to the measuring reference 6 for measuring arrow height (see, e.g., FIG. 6). The device 5 for measuring arrow location fits onto the arrow shaft 1 by wedging the arrow shaft 1 in the arrow groove 13, and tightening lock screw 20 to hold the device 5 in place. When measuring the arrow shaft 1 height, the weight offsetting system 7 is installed into the threaded hole(s) 18.

FIG. 6 is a perspective top view of the example device 5 for measuring arrow shaft 1 location or position. In FIG. 6, the measurement reference 6 is shown installed in recess 11 and may be held in place by threaded screw 19. Indicator marks 14 are provided to accurately measure the center shot or distance from the center of the arrow shaft 1 to the inside edge of the riser shelf 2A. In an example, an adjustment knob 16 may be provided to precisely move the measurement reference 6 until it touches the riser shelf 2A.

Figure 7:
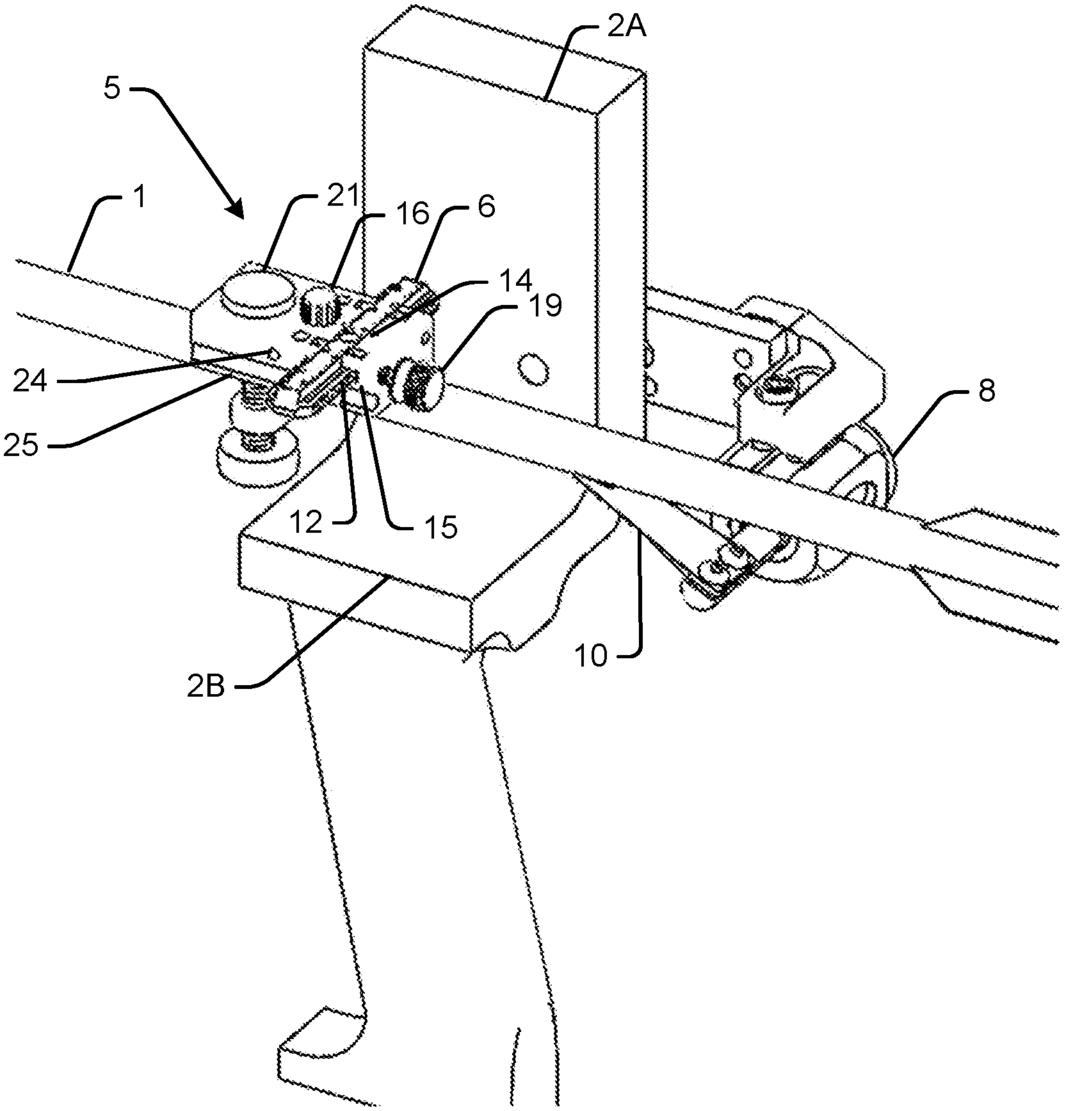
FIG. 7 is a perspective view of the example device attached to the arrow shaft with measuring reference recording center shot.

FIG. 7 is a perspective view of the example device 5 for measuring arrow shaft 1 location or position. In FIG. 7, the device 5 is installed on the arrow shaft 1 with the arrow shaft 1 resting in the arrow rest launcher 10. The level indicator 21 shows that the device 5 is sitting parallel to the riser shelf 2B and that the measurement reference 6 measures perpendicular to the arrow shaft 1. The measurement reference 6 is installed in recess 11 with threaded screw 19 holding it in place. The device 5 is slid over until its end is touching the inside edge of the riser shelf 2A.

Figure 8:
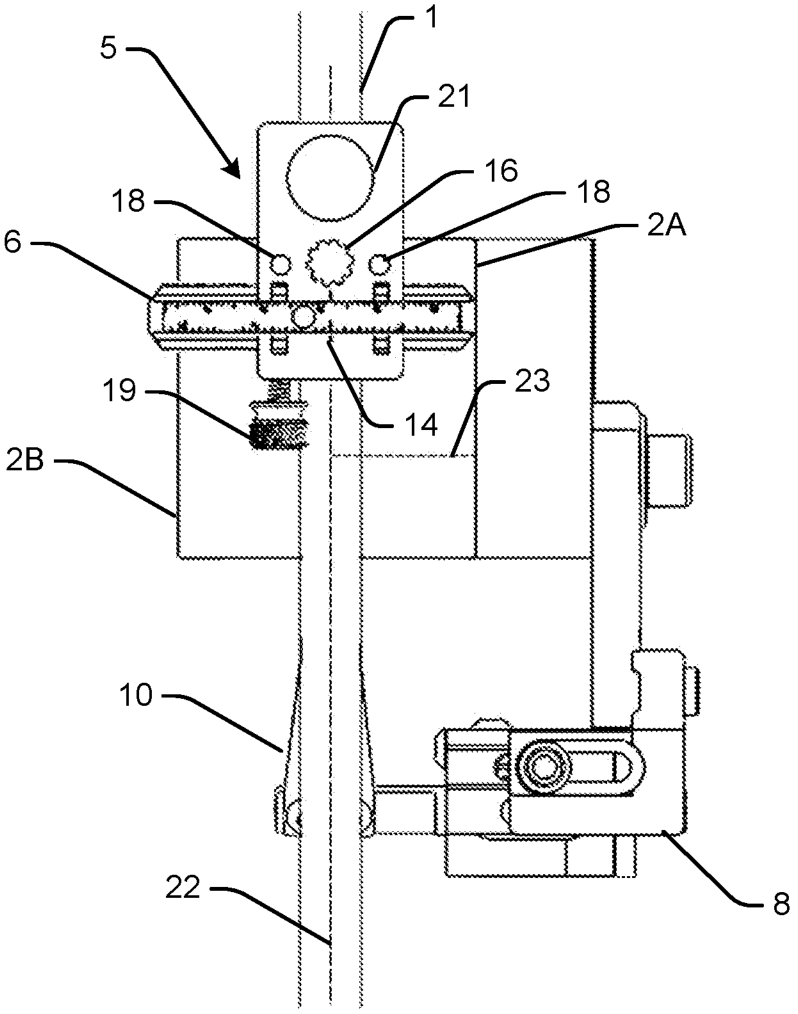
FIG. 8 is a top perspective view of the example device attached to the arrow shaft measuring center shot.

FIG. 8 is a perspective top view of the example device 5 for measuring arrow shaft 1 location or position. In FIG. 8, the device 5 is installed level on the arrow shaft 1 with the arrow shaft 1 sitting centered in the arrow rest launcher 10. The measuring reference 6 is touching the inside edge of the riser 2A and the threaded screw 19 is holding it in place. Indicator marks 14 enable the archer to accurately measure center shot 23 or the distance from the center of arrow shaft 1 and the inside edge of the riser shelf 2A. Center shot 23 is measured as the lateral distance between the centerline of the arrow 22 and the inside edge of the riser shelf 2A.

Figure 9:
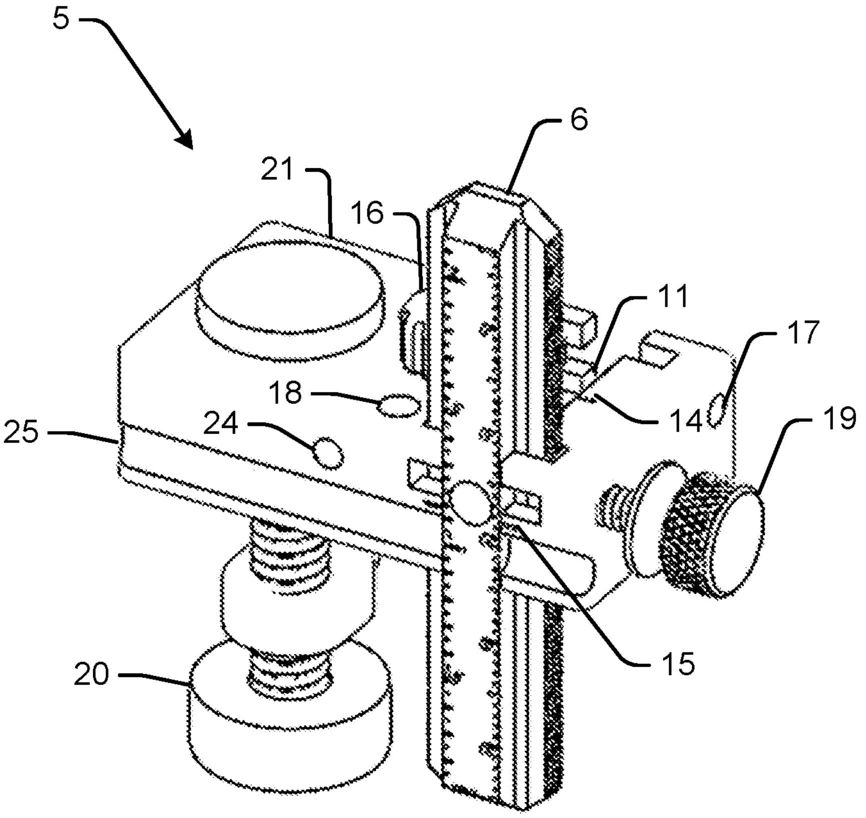
FIG. 9 is a perspective view of the example device as it sits off the arrow shaft with the measurement reference set for arrow height.

FIG. 9 is a perspective view of the example device 5 for measuring arrow shaft 1 location or position. In FIG. 9, the measuring reference 6 is installed in recess 12, and held in place by threaded screw 19. Indicator marks 15 and the measurement reference 6 indicates arrow height.

Figure 10:
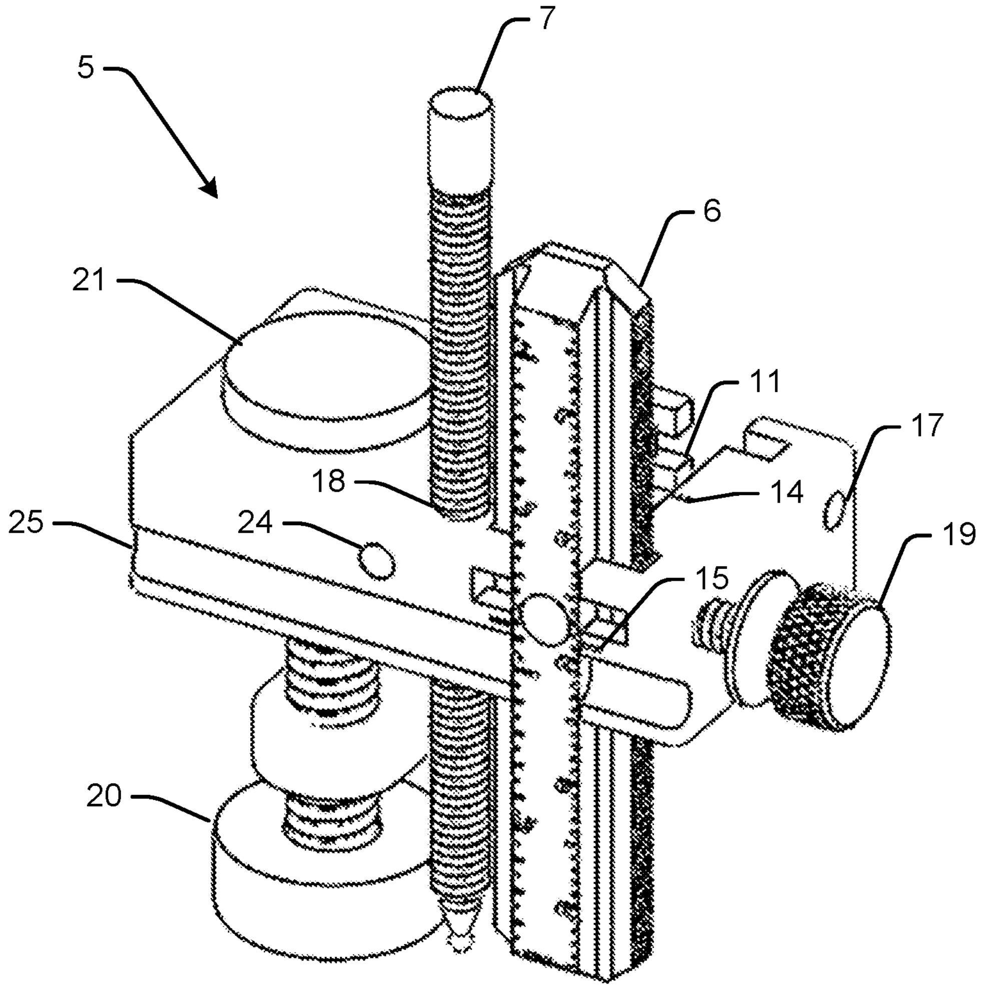
FIG. 10 is a perspective view of the example device as it sits off the arrow with the measurement reference set for arrow height and weight offset system installed.

FIG. 10 is a perspective view of the example device 5 for measuring arrow shaft 1 location or position. In FIG. 10, the measuring reference 6 is installed in recess 12 and may be held in place by threaded screw 19. Weight offset system 7 is threaded into threaded hole(s) 18 and applies a pressure against the riser shelf 2A and lifts the device 5 and arrow shaft 1 to specified heights.

Figure 11:
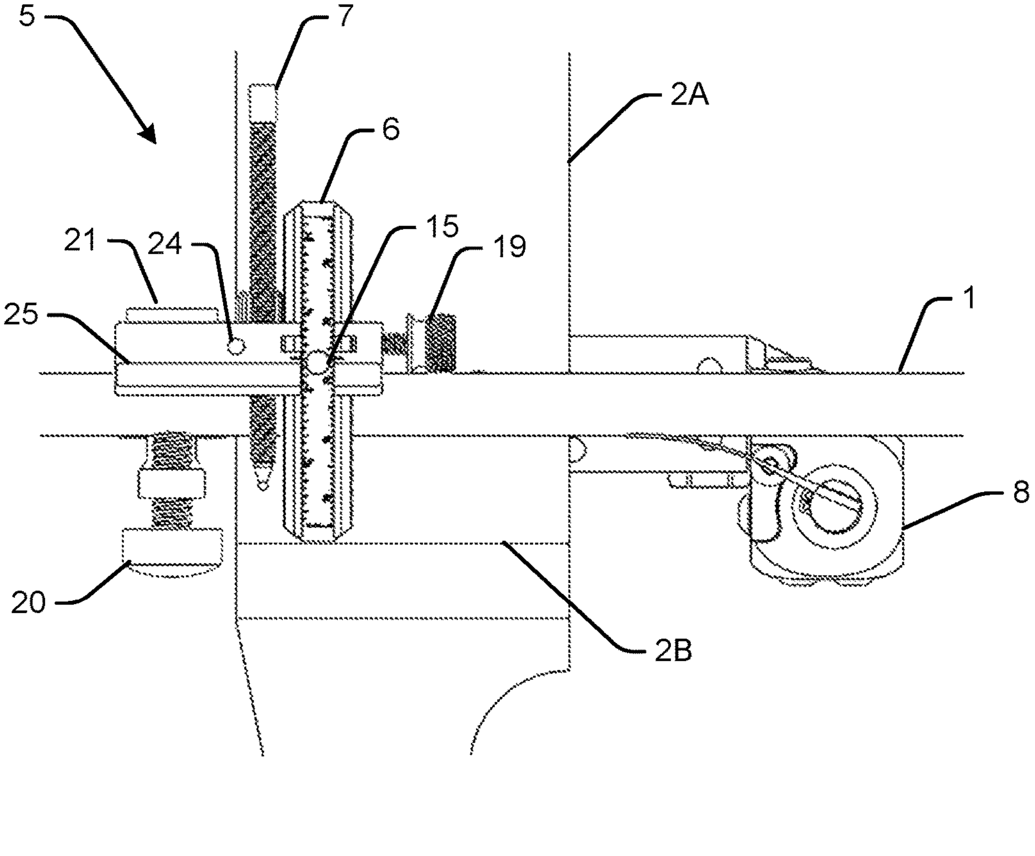
FIG. 11 is a perspective view of the example device as it sits on the arrow with the arrow weight flexing the launcher.

FIG. 11 is a perspective view of the example device 5 for measuring arrow shaft 1 location or position. In FIG. 11, the device 5 is installed on the arrow shaft 1 with the arrow shaft 1 centered in the arrow rest launcher 10.

In this example, the weight offset system 7 is shown not in contact with the riser shelf 4 and it is not extended to lift the arrow shaft 1. In this example, the launcher is yielding under the weight of the arrow shaft 1 and the device 5. Due to the different flex rates of the arrow rest launcher 10 and varying weights of arrow shafts 1, measuring the height of the arrow shaft 1 as-is would be inconsistent and inaccurate.

Figure 12:
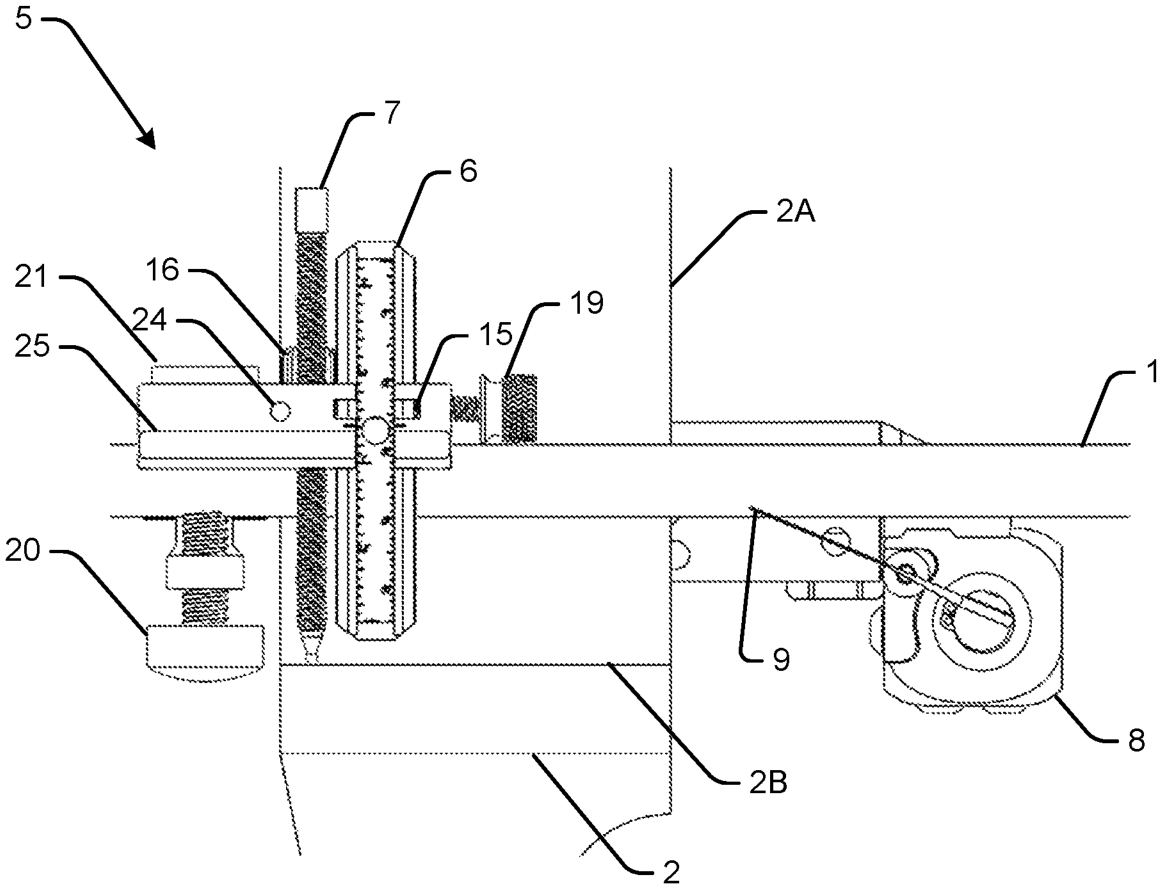
FIG. 12 is a perspective view of the example device on the arrow with the weight offset system extended and the arrow weight relieved from the launcher and the launcher straight.

FIG. 12 is a perspective view of the example device 5 for measuring arrow shaft 1 location or position. In FIG. 12, the device 5 is installed on the arrow shaft 1 with the arrow shaft 1 centered in an arrow rest launcher 9. In this example, the weight offset system 7 is extended and is lifting the arrow until the arrow rest launcher 9 is linear with the arrow shaft 1 still in contact with arrow rest launcher 9.

In this example, the weight offset system 7 is relieving the weight of the arrow shaft 1 and device 5 off the arrow rest launcher 9, so it is no longer yielding and represents the arrow location at full draw. In FIG. 12, the measurement reference 6 is not in contact with the riser shelf 2A due to the difference in arrow height from the previous yielding of the arrow rest launcher 9.

Figure 13:
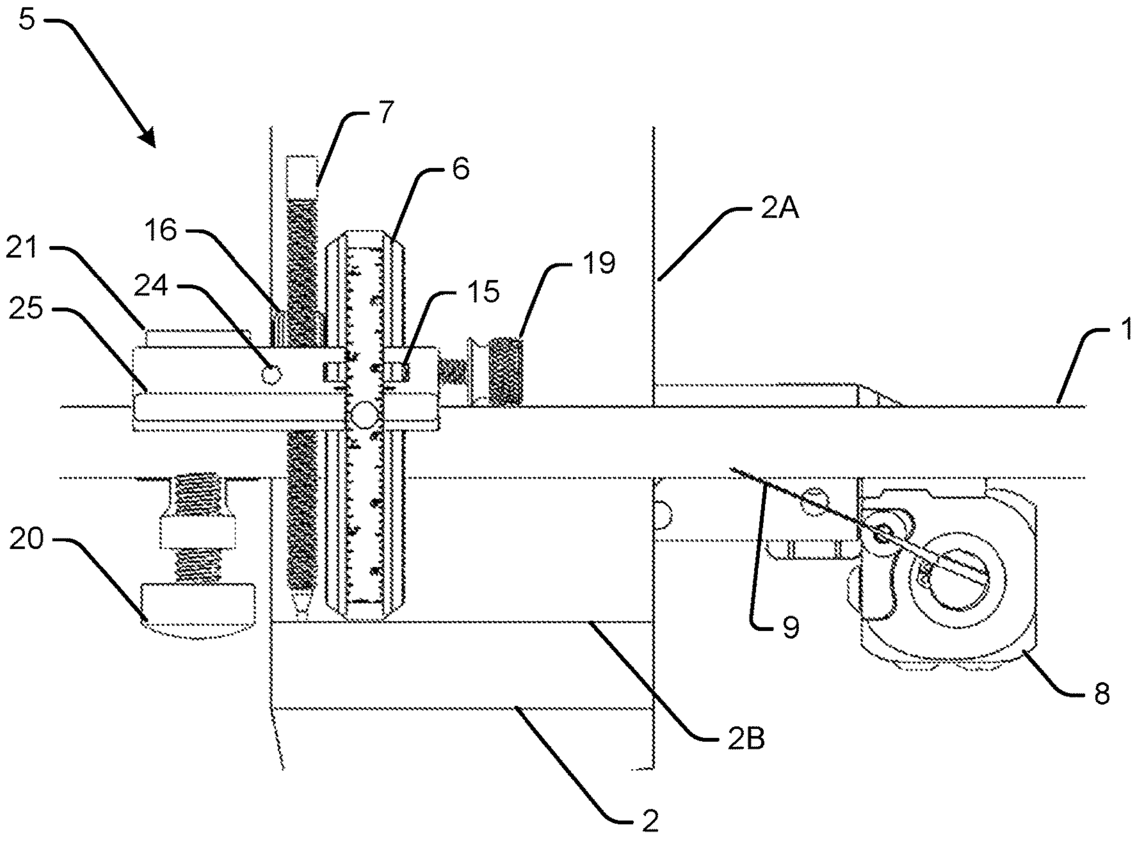
FIG. 13 is a perspective view of the example device on the arrow and kickstand extended.

FIG. 13 is a perspective view of the example device 5 for measuring arrow shaft 1 location or position. In FIG. 13, the device 5 is installed on the arrow shaft 1 with the arrow shaft centered in the arrow rest launcher 9. The weight offset system 7 is extended against the riser shelf 2A and is holding the weight of the arrow shaft 1 and the device 5 with the arrow shaft 1 barely in contact with the arrow rest launcher 9.

In this example, the weight offset system 7 is holding this weight. The arrow shaft 1 is at the same height that it would be at full draw, and is accurate to measure or reference. The measuring reference 6 is flush against the riser shelf 2B and can be compared against the vertical reference marks 15 to determine the arrow shaft 1 height in comparison to the riser shelf 2B.

Figure 14:
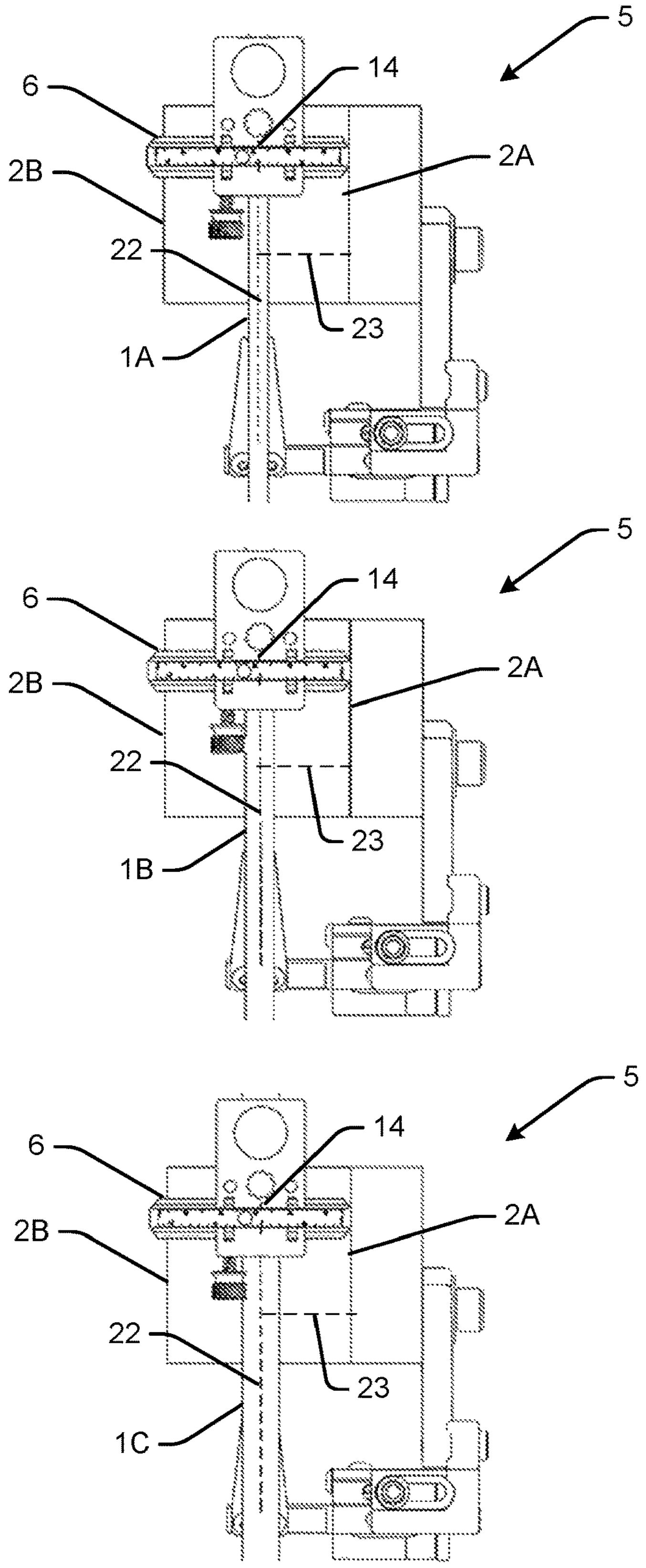
FIG. 14 shows top perspective views of an arrow and the example device illustrating the relation to the riser as the arrow diameter changes.

FIG. 14 shows top perspective views of arrow shafts 1A, 1B, and 1C with example device 5 having riser shelf 2A, 2B. In FIG. 14, arrow shafts 1A, 1B, and 1C each have different diameter shafts. Arrow 1A has a shaft with a diameter of 0.166". Arrow 1B has a shaft with a diameter of 0.246". Arrow 1C has a shaft with a diameter of 0.42".

As the arrow shaft diameter changes, it can be seen that the centerline 22 of the arrow shafts 1A-1C stays in-line with the reference marks 14, thereby giving an accurate measurement of center shot 23.

Figure 15:
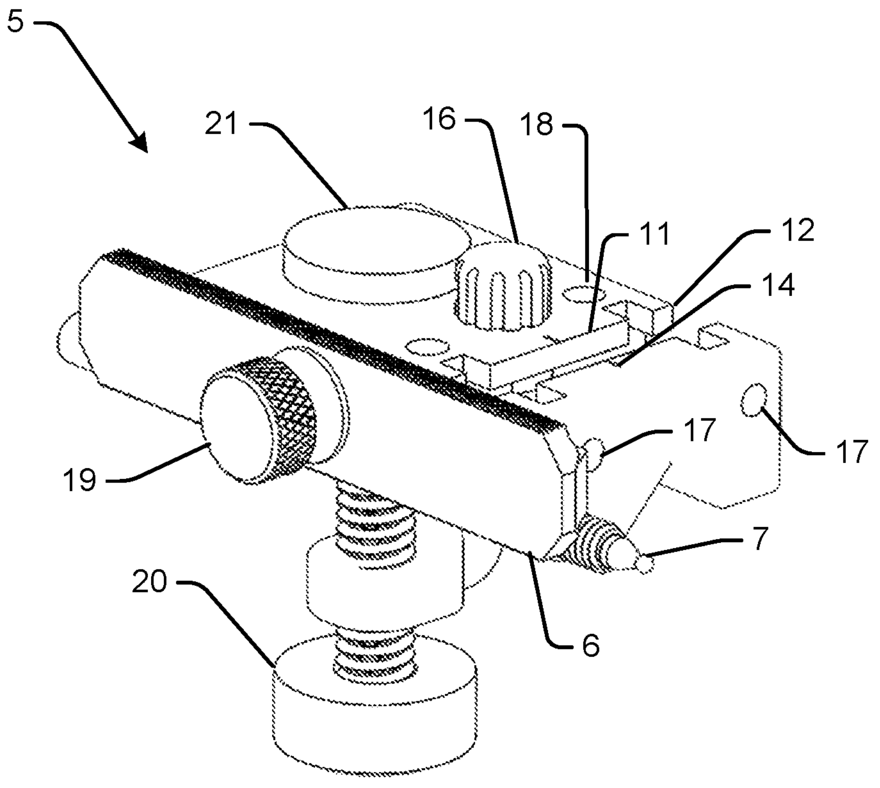
FIG. 15 is a perspective view showing the measurement reference and kickstand stored on the side of the example device.

FIG. 15 is a perspective view showing the measurement reference 6 and kickstand 7 stored on the side of the rest. The thumb screw 19 may be threaded into storage cavity or opening 24. Kickstand 7 rests in groove 25 and is held in place by the measurement reference 6.

Figure 16:
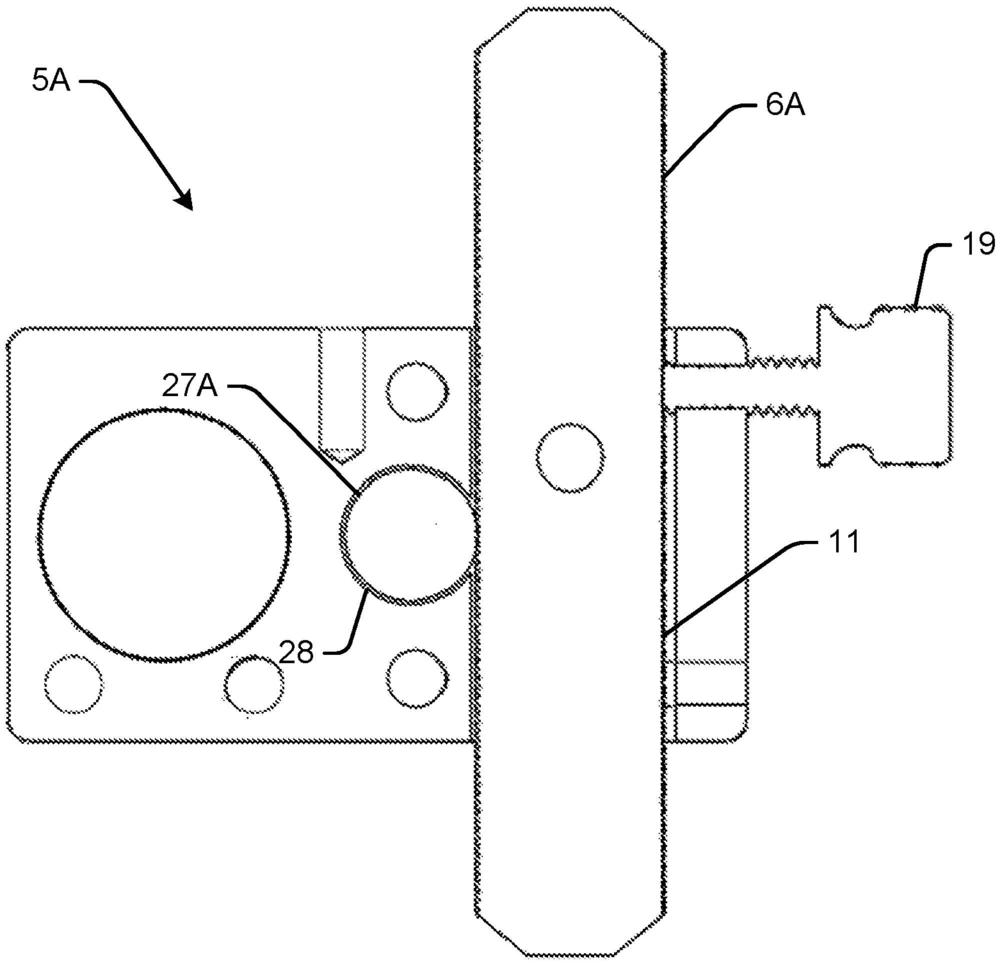
FIG. 16 is a cross section view from the bottom of another example device.

FIG. 16 is a cross section view from the bottom of another example device 5A for measuring arrow shaft 1 location or position. Device 5A utilizes a smooth tuning wheel 27A and a textured side of the measurement reference 6A for adjusting the measurement reference 6A.

FIG. 16 illustrates the interaction of the tuning wheel 27A and the measuring reference 6A. The tuning wheel 27A is connected to adjustment knob 19 and fits to the size of the measurement reference 6A. When the adjustment knob 19 is turned, it precisely moves the measurement reference linearly. In an example, the tuning wheel 27A fits in a recess 28 to provide clearance from the arrow track 11.

Figure 17:
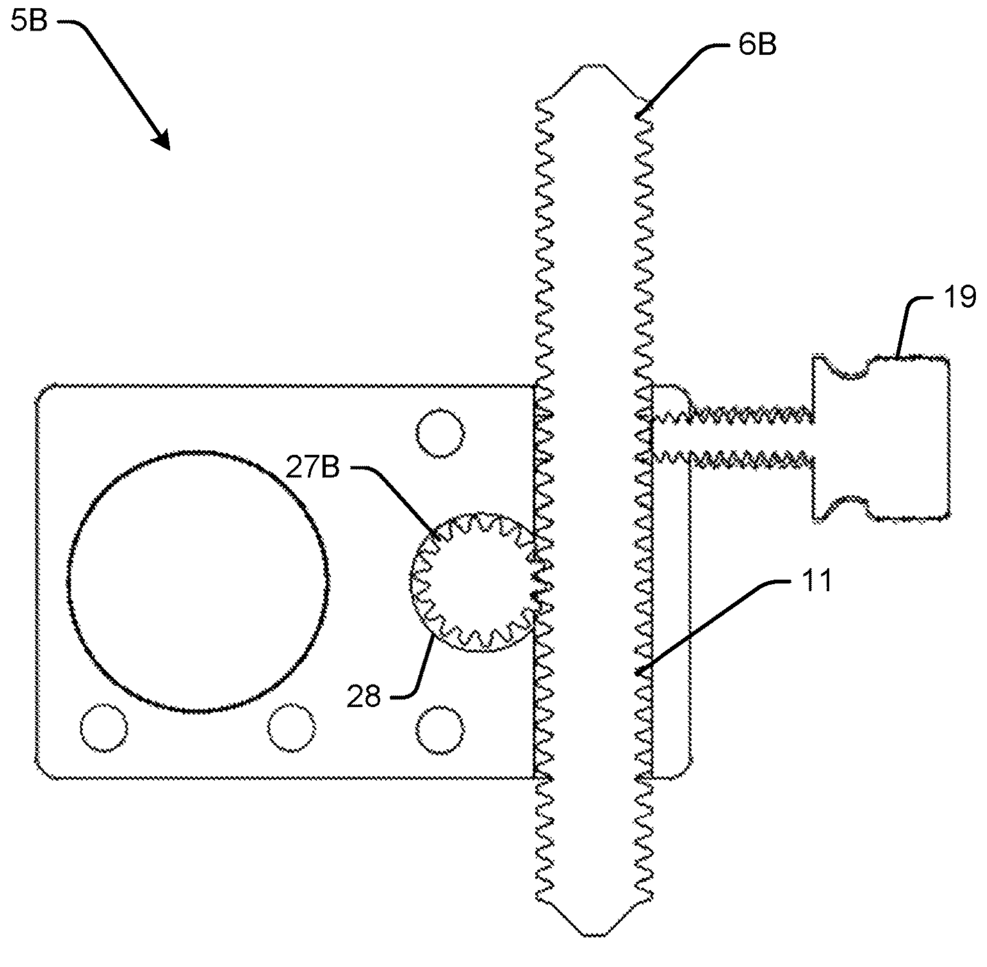
FIG. 17 is a cross section view from the bottom of another example device.

FIG. 17 is a cross section view from the bottom of another example device 5B for measuring arrow shaft 1 location or position. Device 5B utilizes a measurement reference 27B with rack sides and tuning wheel 6B pinion.

FIG. 17 illustrates the interaction of the tuning wheel 27B and the measuring reference 6B. The tuning wheel 27B is connected to adjustment knob 19 and fits to the size of the measurement reference 6B so that when the adjustment knob 19 is turned, it precisely moves the measurement reference linearly. In an example, the tuning wheel 27B fits in a recess 28 to provide clearance from the arrow track 11.

It is noted that the examples shown and described are provided for purposes of illustration and are not intended to be limiting. Still other examples are also contemplated.

The invention claimed is:

1. A device for measuring arrow position at rest, comprising:
- a platform that mounts to an archery bow system arrow to determine a position of the arrow shaft in relation to an inside of a riser shelf of the archery bow system for tuning or data collection;
- a first slot in the platform;
- at least one center shot indicator adjacent the first slot to reference center shot of the arrow shaft;
- a measurement reference slidable in the first slot to reference center shot of the arrow shaft; and
- a weight offsetting system attachable to the platform, the weight offsetting system reducing error due to weight of the arrow and the device that flexes an arrow launcher of the archery bow system.

2. The device of claim 1, wherein the first slot is a vertical slot formed in a side of the platform.

3. The device of claim 1, further comprising a second slot that is a horizontal slot formed in the top of the platform.

4. The device of claim 1, further comprising an adjustment knob to precisely secure the measurement reference as the measurement reference touches to a riser shelf of the archery bow system.

5. The device of claim 1, wherein the weight offset system relieves the weight of the arrow and device from a yielding arrow rest launcher of the archery bow system so that the arrow rest launcher returns to a linear position representing a height position of the arrow shaft at full draw.

6. The device of claim 5, wherein, when the arrow rest launcher is in a linear state, an accurate measurement is not influenced by arrow weight, device weight, launcher rigidity, or degradation of the arrow rest launcher over time.

7. The device of claim 6, wherein, a relieved vertical position is estimated by an attached level.

8. The device of claim 1, further comprising a lock to hold the platform to the archery bow system arrow.

9. The device of claim 1, further comprising a kickstand stored on a side of the platform.

10. The device of claim 1, wherein the measuring reference indicates a tangible horizontal distance from the center of the arrow shaft in relation to the inside of the riser shelf.

11. The device in claim 1, wherein the measuring reference indicates a tangible vertical distance in relation to the arrow shaft and the top of the riser shelf.

12. The device of claim 1, further comprising a level for assessing horizontally level of the platform.

13. A device for measuring arrow position at rest, comprising:
- a platform that mounts to an archery bow system to determine a position of an arrow shaft in relation to an inside of a riser shelf of the archery bow system for tuning or data collection;
- a first slot in the platform;
- at least one height indicator adjacent the first slot to reference height of the arrow shaft;
- a measurement reference slidable separately in the first slot to reference height of the arrow shaft; and
- a weight offsetting system attachable to the platform, the weight offsetting system reducing error due to weight of the arrow and the device that flexes an arrow launcher of the archery bow system.

14. The device of claim 13, further comprising:
- a second slot in the platform;
- at least one center shot indicator adjacent the second slot to reference center shot of the arrow shaft; and
- a measurement reference slidable separately in the second slot to reference center shot of the arrow shaft.

15. A device for measuring arrow position at rest, comprising:
- a platform that mounts to an archery bow system arrow to determine a position of an arrow shaft in relation to an inside of a riser shelf of the archery bow system for tuning or data collection;
- a first slot in the platform;
- at least one center shot indicator adjacent the first slot to reference center shot of the arrow shaft;
- a second slot in the platform;
- at least one height indicator adjacent the second slot to reference height of the arrow shaft;
- a measurement reference slidable separately in the first slot to reference center shot of the arrow shaft and in the second slot to reference height of the arrow shaft; and
- a weight offsetting system attachable to the platform, the weight offsetting system reducing error due to weight of the arrow and the device that flexes an arrow launcher of the archery bow system.

16. The device of claim 15, further comprising an adjustment knob to precisely secure the measurement reference as the measurement reference touches a riser shelf of the archery bow system.

17. The device of claim 15, wherein the weight offset system relieves the weight of the arrow and device from a yielding arrow rest launcher of the archery bow system so that the arrow rest launcher returns to a linear position representing a height position of the arrow shaft at full draw, and wherein an accurate measurement is not influenced by arrow weight, device weight, launcher rigidity, or degradation of the arrow rest launcher over time.

18. A device for measuring arrow position at rest, comprising:
- a platform that mounts to an archery bow system arrow to determine a position of an arrow shaft in relation to an inside of a riser shelf of the archery bow system for tuning or data collection;
- a first slot in the platform, wherein the first slot is a vertical slot formed in a side of the platform;
- at least one center shot indicator adjacent the first slot to reference center shot of the arrow shaft; and
- a measurement reference slidable in the first slot to reference center shot of the arrow shaft.

19. A device for measuring arrow position at rest, comprising:

a platform that mounts to an archery bow system arrow to determine a position of an arrow shaft in relation to an inside of a riser shelf of the archery bow system for tuning or data collection;

a first slot in the platform;

at least one center shot indicator adjacent the first slot to reference center shot of the arrow shaft;

a measurement reference slidable in the first slot to reference center shot of the arrow shaft; and an adjustment knob to precisely secure the measurement reference to the platform as the measurement reference touches a riser shelf of the archery bow system.

20. A device for measuring arrow position at rest, comprising:

a platform that mounts to an archery bow system arrow to determine a position of an arrow shaft in relation to an inside of a riser shelf of the archery bow system for tuning or data collection;

a first slot in the platform;

at least one center shot indicator adjacent the first slot to reference center shot of the arrow shaft;

a measurement reference slidable in the first slot to reference center shot of the arrow shaft; and a kickstand stored on a side of the platform.

21. A device for measuring arrow position at rest, comprising:

a platform that mounts to an archery bow system arrow to determine a position of an arrow shaft in relation to an inside of a riser shelf of the archery bow system for tuning or data collection;

a first slot in the platform;

at least one center shot indicator adjacent the first slot to reference center shot of the arrow shaft; and a measurement reference slidable in the first slot to reference center shot of the arrow shaft, wherein the measuring reference indicates a tangible vertical distance in relation to the arrow shaft and the top of the riser shelf.

* * * * *